(12) United States Patent
Fear

(10) Patent No.: US 10,319,005 B2
(45) Date of Patent: Jun. 11, 2019

(54) ESTABLISHING A BILLING ADDRESS FOR A DEVICE BY DETERMINING A LOCATION OF THE DEVICE

(71) Applicant: NVIDIA Corporation, Santa Clara, CA (US)

(72) Inventor: Andrew Fear, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 441 days.

(21) Appl. No.: 15/005,822

(22) Filed: Jan. 25, 2016

(65) Prior Publication Data

US 2017/0213263 A1 Jul. 27, 2017

(51) Int. Cl.
G06Q 30/04 (2012.01)
G06F 17/24 (2006.01)

(52) U.S. Cl.
CPC ........... G06Q 30/04 (2013.01); G06F 17/243 (2013.01)

(58) Field of Classification Search
CPC .. G06F 3/0484; G06F 3/04886; G06F 17/243; H04N 21/2543; H04N 21/475
USPC .......................................................... 705/34
See application file for complete search history.

(56) References Cited

U.S. PATENT DOCUMENTS

| 8,676,273 | B1 * | 3/2014 | Fujisaki | H04M 1/6505 379/142.06 |
| 8,874,713 | B1 * | 10/2014 | Herring | H04W 4/028 701/411 |
| 9,514,452 | B2 * | 12/2016 | Dhar | G06Q 20/10 |
| 10,108,953 | B2 * | 10/2018 | Ignatchenko | G06Q 20/3825 |
| 2005/0257148 | A1 * | 11/2005 | Goodman | G06F 17/243 715/226 |
| 2006/0167710 | A1 * | 7/2006 | King | G06Q 30/0601 705/313 |
| 2008/0208456 | A1 * | 8/2008 | Jouline | G01C 21/36 701/420 |
| 2009/0290697 | A1 * | 11/2009 | Adams | H04M 1/576 379/142.04 |
| 2010/0087175 | A1 * | 4/2010 | Roundtree | H04M 3/42178 455/414.1 |
| 2010/0153151 | A1 * | 6/2010 | Toenjes | G06Q 10/06395 705/7.41 |
| 2011/0112754 | A1 * | 5/2011 | Reed | G01C 21/367 701/532 |
| 2012/0210386 | A1 * | 8/2012 | Kim | H04N 21/4622 725/148 |
| 2013/0155171 | A1 * | 6/2013 | Mock | H04N 7/142 348/14.03 |
| 2013/0238236 | A1 * | 9/2013 | Thrun | G01C 21/206 701/418 |
| 2013/0275306 | A1 * | 10/2013 | Ignatchenko | G06Q 20/3825 705/44 |

(Continued)

Primary Examiner — Andrew Joseph Rudy

(57) ABSTRACT

To establish a target (e.g., billing) address, a device receives a first physical address determined by geolocating the device (e.g., based on an Internet Protocol (IP) address associated with the device). A street-level map that includes an indicator that is rendered at a first location in the map corresponding to the first physical address is displayed. The indicator can be moved from the first location to one or more other locations in the map. The device receives a selection of a physical address corresponding to the location in the map of the indicator when the selection is made. The device records the selected physical address as the target address.

19 Claims, 6 Drawing Sheets

(56) References Cited

U.S. PATENT DOCUMENTS

| | | | |
|---|---|---|---|
| 2014/0143136 A1* | 5/2014 | Dhar | G06Q 20/10 |
| | | | 705/39 |
| 2014/0143151 A1* | 5/2014 | Dhar | G06Q 20/10 |
| | | | 705/44 |
| 2014/0201001 A1* | 7/2014 | Rellas | G06Q 30/0607 |
| | | | 705/14.58 |
| 2014/0221016 A1* | 8/2014 | Lee | G08B 21/0269 |
| | | | 455/456.3 |
| 2014/0359510 A1* | 12/2014 | Graf | G01C 21/3667 |
| | | | 715/771 |
| 2016/0294958 A1* | 10/2016 | Zhang | H04W 4/02 |
| 2016/0357768 A1* | 12/2016 | Strong | G06F 17/3087 |
| 2017/0068687 A1* | 3/2017 | Konstantinov | H04L 67/42 |
| 2017/0123618 A1* | 5/2017 | Porcella | G06F 3/0485 |

* cited by examiner

120  GUI 200

| | | | |
|---|---|---|---|
| FIRST NAME | JOHN | STATE/PROVINCE | TEXAS |
| LAST NAME | SMITH | ZIP CODE | 12345 |
| ADDRESS LINE 1 | 123 MAIN ST. | COUNTRY | USA |
| ADDRESS LINE 2 |  | PHONE NO. | 1012223333 |
| CITY | AUSTIN | | |

Fig. 5

ESTABLISHING A BILLING ADDRESS FOR A DEVICE BY DETERMINING A LOCATION OF THE DEVICE

BACKGROUND

Many contemporary consumer electronics companies sell not only devices such as gaming consoles and set-top boxes that can be connected to televisions, but also sell goods and services that can be used by those devices, such as video games, game subscriptions, applications, movies, shows, and the like. These types of goods and services can often be ordered and paid for directly through the device itself, using billing information (e.g., a billing address) that is stored by the device so that the billing information does not have to be entered each time a user wishes to purchase a product or service.

A device like a gaming console or set-top box may be equipped with a game controller or a remote control but is not equipped with more traditional accessories such as a keyboard or a mouse. Thus, to enter a billing address and store it on the device, a user has to use the buttons on the remote control, for example. Each of those buttons usually includes both a number and a set of letters, and so the user must switch back-and-forth between numbers and letters and also must select which letter to use. Alternatively, a virtual keyboard may be displayed on the television, in which case the user must use arrow keys on the remote control or the directional control on the game controller to scroll back-and-forth across the keyboard to reach the correct key, then press another button to select that key. Thus, entering information can be awkward. Correcting errors also can be awkward, usually requiring the use of a backspace key that may erase correct information along with the incorrect information. Consequently, the task of entering billing information such as a billing address, while not extremely difficult, can be relatively time-consuming and therefore inconvenient to users.

Accordingly, a device and/or method that enables billing information to be more conveniently entered would be of value.

SUMMARY

Embodiments according to the present disclosure pertain to devices and methods for quickly, accurately, and conveniently determining and entering billing information, particularly a billing address.

In an embodiment, a device connects to the Internet and receives a first physical address determined by geolocating the device. In an embodiment, the first physical address is based on an Internet Protocol (IP) address associated with the device. A street-level map, including an indicator that is rendered at a first location in the map corresponding to the first physical address, is displayed. If necessary, the indicator can be moved from the first location to other locations in the map. The device receives a selection of a physical address corresponding to the location in the map of the indicator when the selection is made. The device records the selected physical address as the billing address.

More specifically, in an embodiment, the first physical address (the initial location of the indicator) may be the address to be used as the billing address, or it may be relatively close to but not at the correct billing address. If the first physical address matches the correct billing address, then the first physical address can be selected and recorded as the billing address. If the first physical address does not match the correct billing address, then the arrow keys on a remote control or a directional control on a game controller, for example, can be used to move the indicator to the address (the second physical address) that matches the correct billing address, and the second physical address can then be selected and recorded as the billing address. The billing address can be selected by, for example, pressing a button on the remote control or game controller when the indicator is in the correct location in the map.

In an embodiment, a graphical user interface (GUI) that includes fields for a street address and a city name, for example, is displayed. In such an embodiment, the GUI can also include a virtual button that, when selected (e.g., by pressing a button on the remote control or game controller), initiates the process of establishing a billing address and automatically changes the display to the map. In such an embodiment, the display changes back to the fields in response to receiving the selection of the billing address as described above. In such an embodiment, the fields are automatically filled with the billing address when they are displayed in response to receiving the selection of the billing address.

Thus, embodiments according to the present disclosure allow a device to quickly, accurately, and conveniently learn its physical location and store the physical address for that location as its billing address for the subsequent purchase of goods and services.

The device may be, but is not limited to, a set-top box (sometimes referred to as a net-top box), a gaming console, a laptop computer, a tablet computer, a handheld computer, a smart phone, or a (digital) media player, or a device that incorporates any combination of the functionalities provided by such devices (e.g., a combination of a set-top box, media player, and gaming console). The device can include its own display or it can be connected to a display device such as a television.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 1 is a block diagram of an example of a system capable of implementing embodiments according to the present disclosure.

FIGS. 2, 3, 4, and 5 illustrate examples of on-screen displays that can be generated in embodiments according to the present disclosure.

DETAILED DESCRIPTION

Figures 1, 2:
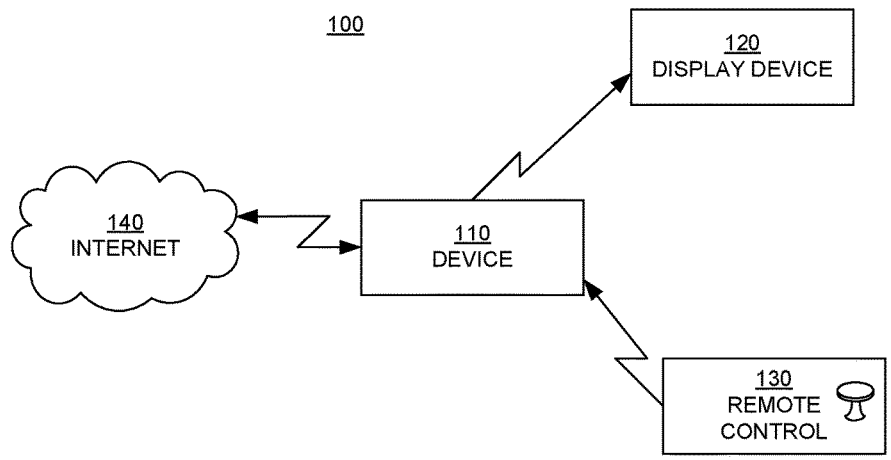

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "displaying," "determining," "changing," "indicating," "moving," "selecting," "recording," "storing," "initiating," "filling," "performing," "generating," or the like, refer to actions and processes (e.g., the flowchart 600 of FIG. 6) of a computing system or similar electronic computing device or processor (e.g., the devices 110a and 110b of FIGS. 7A and 7B, respectively). The computing system or similar electronic computing device manipulates and transforms data represented as physical (electronic) quantities within the computing system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a system 100 capable of implementing embodiments according to the present disclosure. In the example of FIG. 1, the system 100 includes a device 110, a display device 120 communicatively coupled to the device 110, and a remote control 130 communicatively coupled to the device 110. The term "communicatively coupled" is used to mean that the device 110, display device 120, and remote control 130 can be connected by wires or cables or that they can be connected wirelessly. In an embodiment, the device 110 includes its own display device, in which case the display device 120 is optional.

The device 110 may be, but is not limited to, a set-top box (sometimes referred to as a net-top box), a gaming console, a laptop computer, a tablet computer, a handheld computer, a smart phone, or a (digital) media player, or a device that incorporates any combination of the functionalities provided by such devices (e.g., a combination of a set-top box, media player, and gaming console).

In an embodiment, the display device 120 is a television. In an embodiment, the remote control 130 is a game controller. In such an embodiment, the remote control 130 can include a directional control (also known as a thumbstick, d-pad, joy stick, analog stick, or control stick) as well as any number of buttons. There may be more than one remote control associated with the system 100. For example, in addition to the game controller, a more traditional remote control may be used (e.g., a remote control with a numbered keypad that allows a user to select television channels, control volume, etc.).

The system 100, in particular the device 110, can be in communication with the Internet 140 or World Wide Web.

FIG. 2 illustrates elements of an on-screen graphical user interface (GUI) 200 in an embodiment according to the present disclosure. In an embodiment, the GUI 200 is generated by the device 110 and displayed on the display device 120 (FIG. 1).

In the example of FIG. 2, the GUI 200 includes a number of displayed fields including a field 210 for receiving and displaying a street address and a field 220 for receiving a city name. As shown, the GUI 200 can include other fields, such as fields for a name, a field for a state or province, a field for a postal code (e.g., a zip code), a field for a country name, and a field for a phone number.

The GUI 200 also includes a virtual button 230 that, in the FIG. 2 example, is labeled "Auto-Detect." The virtual button 230, when activated, initiates a process of automatically determining a billing address to be stored by the device 110

(FIG. 1). A user can activate the virtual button 230 by, for example, using the remote control 130 to highlight the virtual button or to direct a cursor onto the virtual button, and then selecting or clicking on the virtual button by pressing a physical button on the remote control.

Figure 3:
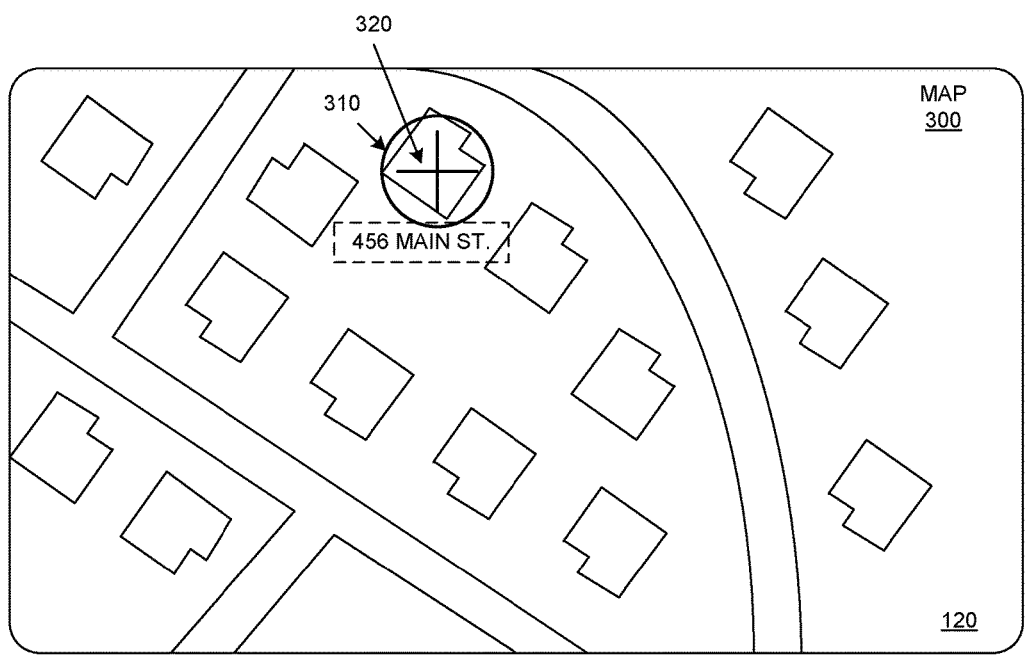

In an embodiment, in response to activation of the virtual button 230, a street-level map 300 (FIG. 3) is automatically displayed on-screen. In the example of FIG. 3, the map 300 replaces the fields described above; that is, the fields may no longer be displayed. Alternatively, the map 300 and the fields can be displayed at the same time. The map 300 is not necessarily initially displayed at the street level; it may be displayed at a different level, in which case the user can zoom in or zoom out depending on the amount of detail that the user wishes to include in the map.

The map 300 includes an indicator 310 that is rendered at a first location 320 in the map, corresponding to a first physical address (e.g., a street address). In the example of FIG. 3, the indicator 310 is a reticle, but embodiments according to the present disclosure are not so limited, and any kind of element can be used as the indicator. The indicator 310 can be moved to different locations in the map. For example, arrow keys or a directional control on the remote control 130 (FIG. 1) can be used to control (move) the indicator 310.

Continuing with reference to FIG. 3, the first location 320 represents a best estimate of the actual location of the device 110 (FIG. 1). More specifically, as noted above, the device 110 is in communication with the Internet. As such, the first location 320 (the first physical address) can be determined based on, for example, the Internet Protocol (IP) address associated with the device 110. The first location 320 can also be determined or derived based on other information and/or methods, such as Global Positioning System (GPS) information, radio frequency (RF) location methods, triangulation, media access control (MAC) address, Wi-Fi positioning system information, etc. Such techniques for determining/deriving a physical address for the device 110 are generally referred to herein as geolocation, and the process of using such techniques is generally referred to herein as geolocating.

The first location 320 in the map may correspond to the actual physical location of the device 110, or the device 110 may be at another physical location that may or may not be near the first location. In other words, the best estimate of the actual location of the device 110 may be absolutely correct, or it may be nearly correct, or it may be far from correct. If the first location 320 matches the actual location of the device 110, then the first physical address can be selected and recorded as the billing address for the device 110. To put it another way, if the user has a particular billing address in mind (the correct billing address), and the first physical address matches the correct billing address, then the first physical address can be selected and recorded (stored) as the billing address for the device 110. A user can select and record the first physical address as the billing address by, for example, pushing a button on the remote control 130 when the indicator 310 is at the first location 320.

Figure 4:
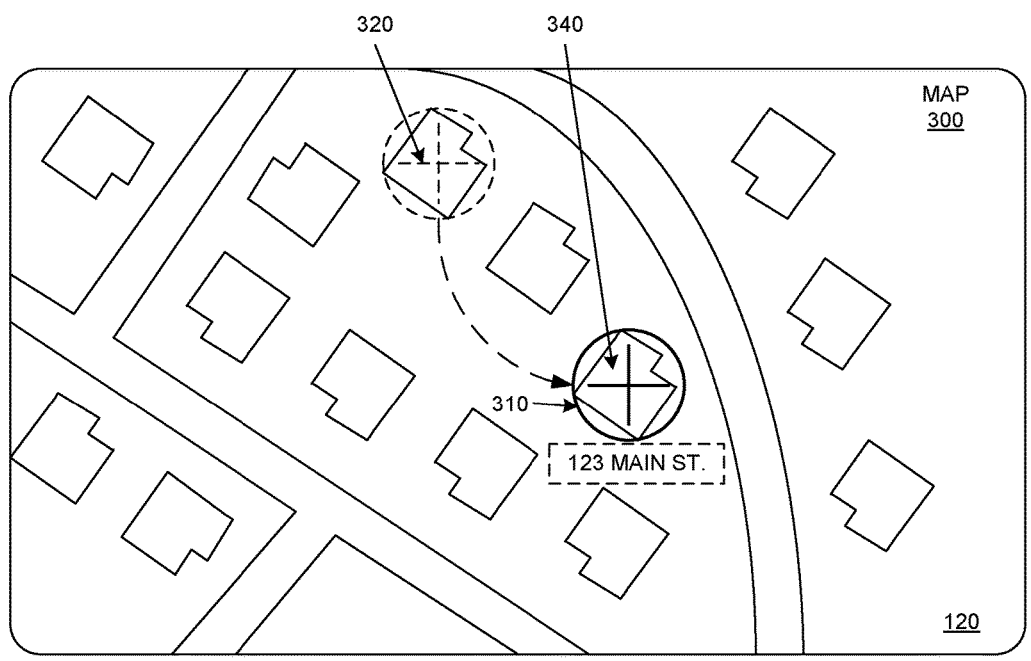

If, on the other hand, the first location 320 does not match the actual location of the device 110 (if the first physical address does not match the correct billing address), then the remote control 130 (e.g., arrow keys or a directional control) can be used to move the indicator 310 to a location (the second location 340) that matches the actual location of the device 110, as shown in the on-screen display of FIG. 4. In essence, a user can fine-tune the best estimate of FIG. 3 so that the indicated location of the device 110 is completely accurate. In other words, the indicator 310 can be moved to an address (a second physical address) that matches the correct billing address. The second physical address can then be selected and recorded as the billing address. A user can select and record the second physical address as the billing address by, for example, pushing a button on the remote control 130 when the indicator 310 is at the second location 340.

The map 300 can include elements (not shown) that facilitate movement of the indicator 310 to different locations in the map. For example, the map can include a compass, a zoom-out element to change the scale of the map so that the indicator 310 can be moved quickly over larger distances, and a zoom-in element. Also, in an embodiment, a physical address corresponding to the location in the map of the indicator 310 can be displayed, as shown in FIGS. 3 and 5.

In an embodiment, once a selection of a billing address is made as described above, the display changes automatically from the map 300 back to the fields included in the GUI 200. As shown in the on-screen display of FIG. 5, those fields are now automatically filled with a billing address (e.g., a street address, a city name, etc.). Other billing information such as a user name and phone number can be entered by the user or auto-filled from another source.

Thus, embodiments according to the present disclosure allow billing information, particularly a billing address, to be quickly, accurately, and conveniently determined, entered, and recorded (stored). A device can quickly, accurately, and conveniently learn its physical location and store the physical address for that location as its billing address for the subsequent purchase of goods and services.

There are instances in which multiple users and/or addresses may be associated with a single street address. For example, a high-rise apartment building may have a single street address but multiple apartment numbers. In these instances, after determining and recording the correct street address as described above, a user only needs to enter the apartment number in the appropriate field of the GUI 200 (e.g., the field for address line 2) using a keypad on the remote control 310 or a virtual keyboard on the display device 120, for example. Thus, the process of the present disclosure still is quicker and more convenient than conventional techniques. Alternatively, the GUI 200 can include a drop-down menu or different drop-down menus from which a user can use the remote control 130 to scroll through and select an apartment number or a combination of letters and numbers that constitute an apartment number by simply pressing buttons on the remote controller, so that the apartment number does not need to be entered using the letters and numbers on the keypad of the remote control 310 or using a virtual keyboard on the display device 120.

Figure 6:
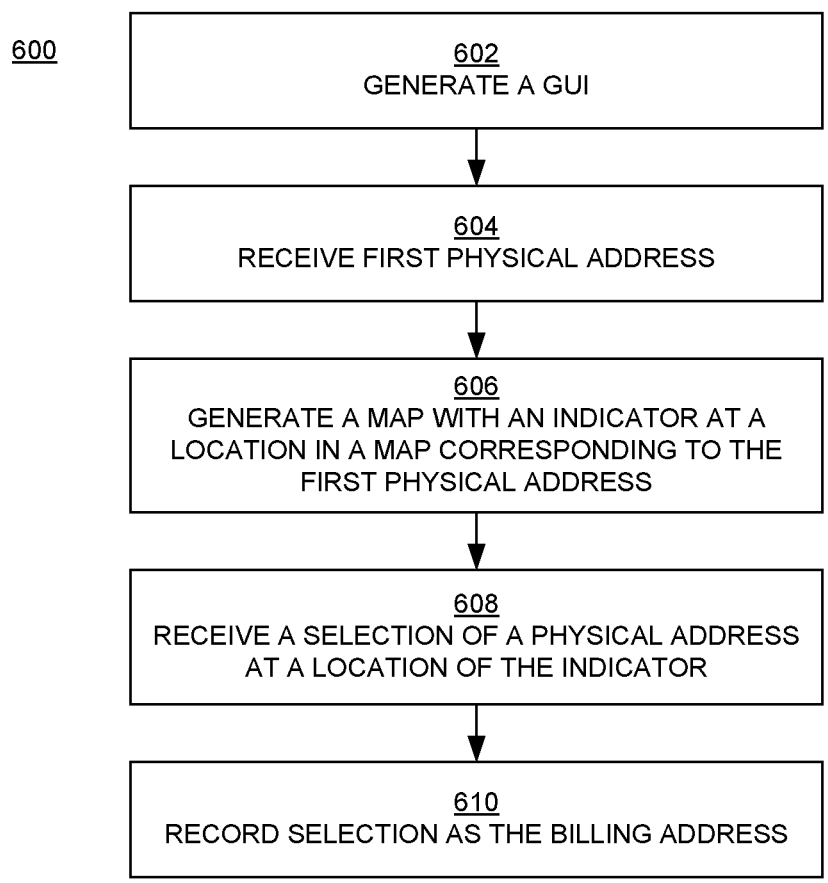
FIG. 6 is a flowchart of an example of a method for establishing a billing address in embodiments according to the present disclosure.

FIG. 6 is a flowchart 600 of an example of a computer-implemented method for establishing a target address (e.g., a billing address) for a device in an embodiment according to the present disclosure. The flowchart 600 can be implemented as computer-executable instructions residing on some form of computer-readable storage medium (e.g., using the device 110 of FIG. 1).

In block 602 of FIG. 6, in an embodiment, the device generates a GUI that includes a virtual button and fields that can be used to receive and display information such as a billing address (see FIG. 2). The GUI can be rendered on a separate display device (e.g., on a television; e.g., see FIGS. 1 and 7A) or on a display device that is integrated with the device 110 (e.g., see FIG. 7B). In an embodiment, activation of the virtual button initiates the method of the flowchart

600. Alternatively, the method can be automatically initiated when, for example, the device 110 is turned on for the first time or when the device detects a change in the geolocation information for the device (e.g., the current IP address is different from the IP address used the previous time the device was used or turned on).

In block 604 of FIG. 6, the device 110 receives a first physical address that is determined by geolocating the device. In an embodiment, the first physical address is based on an IP address associated with the device. Other geolocation techniques can be used to determine the first physical address.

In block 606, the device generates a display that includes a street-level map that includes an indicator that is rendered at a first location in the map that corresponds to the first physical address (see FIG. 3). The indicator can be moved in the map under control of a remote control (e.g., a game controller) (e.g., see FIG. 4). In an embodiment, the display automatically changes from displaying the fields mentioned above to displaying the map in response to activation of the aforementioned virtual button.

In block 608 of FIG. 6, the device receives a selection (e.g., a user input) of a physical address corresponding to a location in the map of the indicator when the selection is made. The location in the map that is selected may correspond to the first physical location 320 (FIG. 3) or the second physical location 340 (FIG. 4) depending on the accuracy of the initial placement of the indicator 310 (that is, depending on how accurately the actual location of the device 110 can be determined based on geolocation, e.g., using the device's IP address).

In block 610 of FIG. 6, the selection is recorded as the target address (e.g., the billing address).

In an embodiment, the display automatically changes from the map back to the fields mentioned above (see FIG. 5). In an embodiment, the fields are automatically filled with information such as the target (billing) address.

Figure 7A:
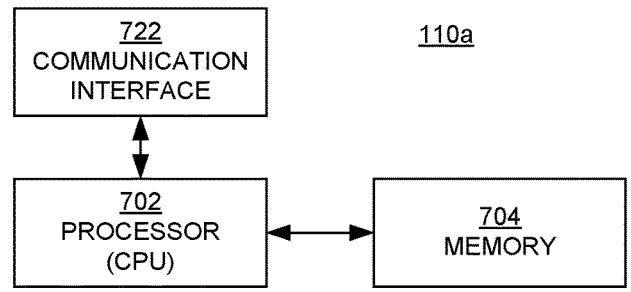
FIGS. 7A and 7B are block diagrams illustrating examples of devices that can implement embodiments according to the present disclosure.

FIG. 7A is a block diagram of an example of a device 110a, which is an embodiment of the device 110 of FIG. 1. The device 110a broadly represents any single or multi-processor computing device or system capable of executing computer-readable instructions. In an embodiment, the device 110a is a set-top box, media player, gaming console, or the like. The device 110a may be powered by a battery and/or by being plugged into an electrical outlet. Depending on the implementation, the device 110a may not include all of the elements shown in FIG. 7A, and/or it may include elements in addition to those shown in FIG. 7A.

In its most basic configuration, the device 110a may include at least one processor 702 (CPU) and at least one memory 704. The processor 702 generally represents any type or form of processing unit capable of processing data or interpreting and executing instructions. In certain embodiments, the processor 702 may receive instructions from a software application or module. These instructions may cause the processor 702 to perform the functions of one or more of the example embodiments described and/or illustrated herein.

The memory 704 generally represents any type or form of volatile or non-volatile storage device or medium capable of storing data and/or other computer-readable instructions. In certain embodiments the computing system 700 may include both a volatile memory unit (such as, for example, the memory 704) and a non-volatile storage device (not shown).

The communication interface 722 broadly represents any type or form of communication device or devices capable of facilitating communication between the device 110a and one or more additional devices. For example, the communication interface 722 may facilitate communication between the device 110a and a network, and/or between the device 110a and a display device (e.g., a television), and/or between the device 110a and a remote controller.

Figure 7B:
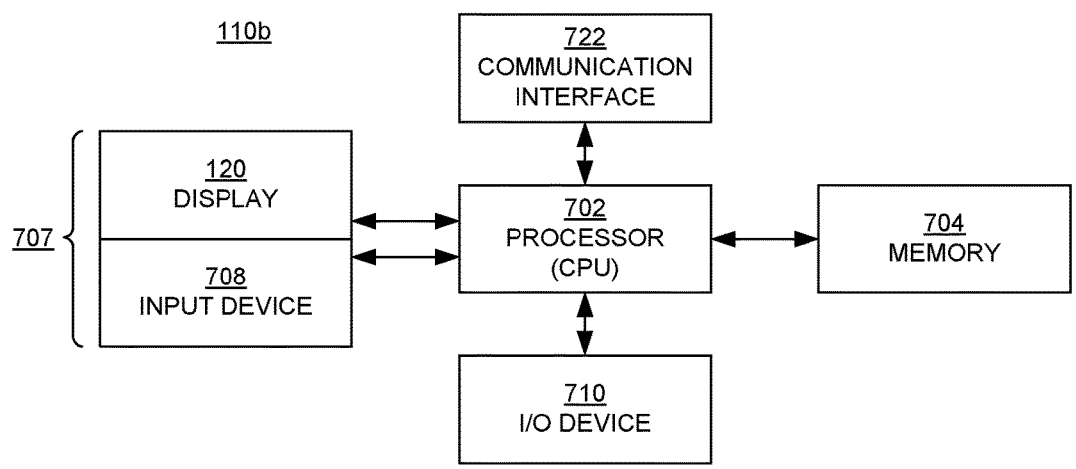

FIG. 7B is a block diagram of another example of a device 110b, which is another embodiment of the device 110 of FIG. 1. Here, the device 110b is, for example, a laptop, tablet, or handheld computer, a cell phone, or a smart phone. In the example of FIG. 7B, the device 110b also includes the display device 120.

The device 110b of FIG. 7B also includes an input device 708 that is operatively coupled to the processor 702. The input device 708 may include a touch sensing device (a touch screen) configured to receive input from a user's touch and to send this information to the processor 702. The processor 702 interprets the touches in accordance with its programming.

An input device 708 may be integrated with the display device 120 or they may be separate components. In the illustrated embodiment, the input device 708 is a touch screen that is positioned over or in front of the display device 706. The input device 708 and display device 120 may be collectively referred to herein as a touch screen display 707.

As illustrated in FIG. 7B, the device 110b may also include at least one input/output (I/O) device 710. The I/O device 710 generally represents any type or form of input device capable of providing/receiving input or output, either computer- or human-generated, to/from the device 110b. Examples of an I/O device 710 include, without limitation, a keyboard, a pointing or cursor control device (e.g., a mouse), a speech recognition device, or any other input device.

Many other devices or subsystems may be connected to the devices 110a and 110b. Conversely, all of the components and devices illustrated in FIGS. 7A and 7B need not be present to practice the embodiments described herein.

The computer-readable medium containing a computer program for implementing the operations described herein may be loaded into the devices 110a and 110b. All or a portion of the computer program stored on the computer-readable medium may then be stored in the memory 704. When executed by the processor 702, a computer program loaded into the devices 110a and 110b may cause the processor 702 to perform and/or be a means for performing the functions of the example embodiments described and/or illustrated herein.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems (e.g., the devices 110a and 110b of FIGS. 7A and 7B), one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in the device 110 (110a/110b). These software modules may configure the device 110 (110a/110b) to perform one or more of the example embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method comprising:
  receiving, at a device communicatively coupled to the Internet and to a display device, a first physical address determined by geolocating the device;
  generating a first graphical user interface (GUI) for display on the display device, the GUI comprising fields including a field for receiving and displaying a street address, a field for receiving and displaying a city name, and a virtual button;
  directing a cursor onto the virtual button in response to first directional movement of a directional control of a remote control communicatively coupled to the device;
  activating the virtual button in response to sensing a first pressing of a physical button of the remote control;
  in response to said activating the virtual button, generating a second GUI for display on the display device, the second GUI comprising a street-level map comprising an indicator that is rendered at a first location in the map, the first location corresponding to the first physical address, wherein the indicator is moveable in the map from the first location in response to second directional movement of the directional control;
  receiving, at the device, a selection of a physical address corresponding to a location in the map of the indicator when the selection is made, wherein the selection occurs in response to sensing a second pressing of the physical button of the remote control; and
  recording the selection as a target address.

2. The method of claim 1, wherein the display device comprises a television coupled to the device and wherein the remote control comprises a game controller comprising the directional control.

3. The method of claim 1, wherein the target address is a billing address.

4. The method of claim 1, wherein the virtual button, when activated, automatically changes the display from the fields to the map.

5. The method of claim 4, further comprising automatically changing the display from the map back to the fields in response to said sensing the second pressing.

6. The method of claim 5, wherein the fields are automatically filled with the billing address when the fields are displayed in response to said sensing the second pressing.

7. The method of claim 1, further comprising displaying a physical address corresponding to a location in the map of the indicator while the indicator is being moved within the map.

8. A device, comprising:
  a processor;
  a communication interface coupled to the processor; and
  memory coupled to the processor, the memory having stored therein instructions that, when executed, cause the device to perform a method comprising:
    generating a graphical user interface (GUI) for display on a display device communicatively coupled to the device, the GUI comprising fields including a field for receiving and displaying a street address, a field for receiving and displaying a city name, and a virtual button;
    directing a cursor onto the virtual button in response to first directional movement of a directional control of a remote control communicatively coupled to the device;
    activating the virtual button in response to sensing a first pressing of a physical button of the remote control while the cursor is on the virtual button;
    receiving a first physical address based on an Internet Protocol (IP) address associated with the device;
    in response to said activating of the virtual button, automatically generating a street-level map for display on the display device, the street-level map comprising an indicator that is rendered at a first location in the map corresponding to the first physical address, wherein the indicator is moveable in the map from the first location in response to second directional movement of the directional control; and
    if the first physical address matches a billing address for the device, then recording the first physical address as the billing address; and otherwise, in response to the second directional movement of the directional control, moving the indicator from the first location to a second location in the map that has a second physical address that matches the billing address, and recording the second physical address as the billing address, wherein said recording the second physical address occurs in response to sensing a second pressing of the physical button of the remote control.

9. The device of claim 8, wherein the display device comprises a television and wherein the remote control comprises a game controller comprising the directional control.

10. The device of claim 8, wherein the method further comprises automatically changing the display from the fields to the map in response to the activation of the virtual button, and automatically changing the display from the map back to the fields in response to said sensing the second pressing.

11. The device of claim 10, wherein the fields are automatically filled with the second physical address when the fields are displayed in response to said sensing the second pressing.

12. The device of claim 8, wherein the display further comprises a physical address corresponding to a location in the map of the indicator while the indicator is being moved within the map.

13. The device of claim 8, selected from the group consisting of: a set-top box; a gaming console; a laptop computer; a tablet computer; a handheld computer; a smart phone; and a media player.

14. A non-transitory computer-readable storage medium having computer-executable instructions that, when executed, cause a device to perform a method comprising:
   generating a graphical user interface (GUI) for display on a display device communicatively coupled to the device, the GUI comprising fields including a field for receiving and displaying a street address, a field for receiving and displaying a city name, and a virtual button;
   directing a cursor onto the virtual button in response to first directional movement of a directional control of a remote control communicatively coupled to the device;
   activating the virtual button in response to sensing a first pressing of a physical button of the remote control while the cursor is on the virtual button;
   receiving a first physical address based on an Internet Protocol (IP) address associated with the device;
   in response to said activating of the virtual button, generating, on the display device, a display comprising a street-level map comprising an indicator that is rendered at a first location in the map corresponding to the first physical address, wherein the indicator is moveable in the map from the first location in response to second directional movement of the directional control;
   receiving, from the remote control, an input causing selection of a second physical address in the map, the second physical address corresponding to a location in the map of the indicator when the selection is made, the second physical address one of the first physical address and an address that is different from the first physical address, wherein the selection occurs in response to sensing a second pressing of the physical button of the remote control; and
   after the selection is made, recording the second physical address as the billing address.

15. The non-transitory computer-readable storage medium of claim 14, wherein the display device comprises a television and wherein the remote control comprises a game controller comprising the directional control.

16. The non-transitory computer-readable storage medium of claim 14, wherein the display further comprises a physical address corresponding to a location in the map of the indicator while the indicator is being moved within the map.

17. The non-transitory computer-readable storage medium of claim 13, wherein the virtual button, when activated, automatically changes the display from the fields to the map.

18. The non-transitory computer-readable storage medium of claim 17, wherein the display changes from the map back to the fields in response to said sensing the second pressing.

19. The non-transitory computer-readable storage medium of claim 18, wherein the fields are automatically filled with the billing address when the fields are displayed in response to said sensing the second pressing.

* * * * *